United States Patent [19]

Gole et al.

[11] Patent Number: 4,945,546
[45] Date of Patent: Jul. 31, 1990

[54] PURELY CHEMICAL PROCESS YIELDING CONTINUOUS LASER AMPLIFICATION IN THE VISIBLE AND ULTRAVIOLET SPECTRAL RANGES

[75] Inventors: James L. Gole, Atlanta, Ga.; James R. Woodward, Chagrin Falls, Ohio; Stephen H. Cobb, Mayfield, Ky.

[73] Assignee: Georgia Tech Research Corporation, Atlanta, Ga.

[21] Appl. No.: 293,322

[22] Filed: Jan. 4, 1989

[51] Int. Cl.$^5$ .............................................. H01S 3/095
[52] U.S. Cl. .......................................... 372/89; 372/57; 372/60
[58] Field of Search ......................... 372/89, 55, 57, 60

[56] References Cited

U.S. PATENT DOCUMENTS 3,982,208  9/1976  Camac .................................... 372/89

Primary Examiner—William L. Sikes
Assistant Examiner—Robert E. Wise
Attorney, Agent, or Firm—Hurt, Richardson, Garner, Todd & Cadenhead

[57] ABSTRACT

A chemical laser comprising means for producing metal trimers, means for dissociating halogen molecules, a reaction chamber, and means for delivering the metal trimer and halogen atoms into the reaction chamber to form electronically excited metal dimer molecules in sufficient concentration to create a population inversion and laser amplification.

41 Claims, 2 Drawing Sheets

PURELY CHEMICAL PROCESS YIELDING CONTINUOUS LASER AMPLIFICATION IN THE VISIBLE AND ULTRAVIOLET SPECTRAL RANGES

BACKGROUND OF THE INVENTION

The development of purely chemically driven visible lasers had been an unattained goal for at least the past twenty years. Visible chemical lasers are difficult to implement because the chemical processes which directly establish requisite population inversions leading to lasing are rare. Until now, the only chemical processes known and used to establish population inversions have lead to lasing primarily in the infrared spectral region, the furthest extension toward the visible being to 1.3 $\mu$. The infrared chemical laser systems cannot be used to produce visible lasing, and an entirely new set of processes had to be developed to create the purely chemically driven visible laser of the present invention. As a result, the process of this invention is wholly not described in any prior art and, as such, there is no known relevant prior art.

Classical laser operation in general requires a population inversion in which the upper energy level associated with the lasing transition is more populated than is the lower energy level on which the transition terminates. Laser oscillation can be established in an optical cavity which allows photons to be reflected back and forth and interact with each other so as to build up the intensity of the radiation. A select group of lasers, including primarily $N_2$ which operates in a pulsed mode under amplified spontaneous emission, does not require such an optical cavity as the photon amplification is so large that sufficient intensity is produced without the necessity of mirrors. A further technique involves stimulated Raman pumping in which an intense laser beam is converted into a beam of another frequency by coherent Raman stimulation in a two or more step scattering process. Each of these lasers operates on electrical energy.

Various types of infrared chemical lasers are known of which there are two main types. The first type involves the mixing of an oxidizer and a fuel gas to produce a continuous output. The mixture is activated by an electrical discharge or by thermal decomposition induced using arc heaters or combustors. The activated mixture produces a reaction initiating species, the reaction sequence eventually leading to a population inversion and lasing involving one of the consituents of the mixture. The second type uses premixed fuels and oxidizers which are activated by flash photolysis with an electron beam or a pulse discharge. However, once the mixture is ignited, it may present flameout and detonation problems and may be difficult to extinguish. Hydrogen halides and carbon monoxide are the two main types of molecules used as lasing species in these chemical lasers.

A typical chemical laser is disclosed in U.S. Pat. No. 4,553,243. This laser operates by expanding the reactant gas mixture continuously through a supersonic nozzle and applying a pulsed electrical discharge to initiate the chemical reaction resulting in the production of the lasing species. The frequency of the electrical pulses can be adjusted so as to regulate the frequency of the laser. The gas mixture is introduced on the fly, usually at pressures from a few Torrs to multi-atmospheres. This laser does not operate as a purely chemically driven system as it requires an electrical discharge to initiate the chemical reation. More importantly, this laser only operates in the infrared region and cannot produce visible lasing.

A chemical oxygen-iodine laser using iodine chloride as a reactant gas is disclosed in U.S. Pat. No. 4,563,062. In this device, iodine chloride is vaporized and entrained in argon gas. This gas mixture is directed into a laser cavity where it is mixed with singlet oxygen. Upon mixing with singlet oxygen, the iodine chloride dissociates into atomic iodine and atomic chlorine. Subsequently, the atomic iodine is excited to a lasing state through collisions with the singlet oxygen. These lasers are typically operated with a laser cavity pressure in the range of 1–3 Torr. Using the oxygen-iodine system one produces a laser which operates at 1.3 $\mu$, in the infrared region. Such systems have not been developed to produce visible lasers.

A typical semiconductor laser, based on the gallium arsenide semiconductor, is disclosed in U.S. Pat. No. 4,446,557. This type of laser requires that an external electric field to be applied using an electrode located on the semiconductor layers. When the external electric field is applied, photons are created which resonate among the semiconductor energy levels so as to produce lasing action. The laser produced by a semiconductor system is at a much longer wavelength than the laser of the present invention and operates among much lower lying energy levels.

Self-pulsing, semiconductor lasers which have a pulsed, rather than a continuous wave output beam are also disclosed in U.S. Pat. No. 4,446,557. However, it is difficult to reliably reproduce devices having a very high pulse repetition rate with extremely good temporal stability. Certain geometries for the semiconductor cavity length directly related to the principal noise resonance wave length have been suggested to alleviate this problem. Self-pulsed semiconductor lasers have the same limitations as the typical semiconducter lasers mentioned above.

Metals having sufficient vapor pressures at relatively low temperatures can be made to lase. To create the vapor pressure necessary for lasing action, metals have been heated in electric or gas fired furnaces to approximately 1675°–1875° K. The large amounts of metal vapor required to make such a laser practical require considerable electric power for heating, thus making the resultant laser very bulky and not readily susceptible to mobilization. The use of a gas fired furnace, which is more mobile than an electric furnace, lessens this problem to some degree but the system is still bulky. The use of either an external oven or discharge heating to produce the high temperatures of between 1675° and 1875° K. makes it difficult to construct the fast discharge circuitry needed for excitation of other self-terminating neutral metal laser transitions. Using metal halides helps to reduce the temperature requirements to some degree. In contrast, the metal vapor producing systems associated with this invention operate in many instances at temperatures 300°–400° K. lower than those associated with previous inventions. In addition, the technology needed to extend operation to these higher temperatures is readily available and in concert with the concept of metal trimer reaction associated with the novel invention outlined herein constitutes a viable and new extension of the higher temperature oven technology as it is or can be applied in the form of supersonic expansions or agglomeration flows.

Another commonly used method for creating metal vapor lasers is to sputter the metal atoms from a cathode of the desired material. Control of the sputtering process has been achieved by entraining the sputtered metal in a gas stream so as to create a metal vapor beam. This metal vapor beam is directed into an optical cavity where a separate electrical discharge system excites the metal vapor. Generally, the metal vapor beam is passed through a ring shaped electrode in order to minimize the electrical discharge necessary to excite the lasing constituents in the beam. Metal vapor lasers are not premised on chemical processes such as those reactions used in the present invention. First, there is no chemical reaction. Second, when based on the metal halides, they generally employ dissociation processes caused by an external laser. Third, they are largely operative in the infrared region with only a few examples operative at shorter wavelengths.

Metal halide pulsed lasers capable of simultaneously providing a plurality of output beams oscillating at discrete wavelengths in the visible and near infrared portions of the spectrum are disclosed in U.S. Pat. No. 4,607,371. Such a plurality of output beams is obtained through the dissociative excitation of a number of vaporized metal halides composed of the Group II B metals. Excitation is achieved either by photo-dissociation or by dissociation through collisions with energetic electrons produced in a transverse discharge or by an electron beam generator. The power of such lasers can be enhanced by using isotopically pure metal halide salts rather than their naturally abundant counterparts. As such, this laser relies on a dissociation process caused by an external laser and not a chemical reaction.

Chemically driven visible lasers offer attractive alternatives to their infrared counterparts; however, the development of a chemically pumped system lasing in the visible region, while occupying the interest of researchers for almost two decades, represents a difficult problem whose solution has met with little success until the present invention. This invention focuses on the development, extension, and detailed quantification of visible chemical laser systems and the demonstration and quantification of laser amplification and oscillation across the visible and ultraviolet regions employing purely or primarily chemically pumped systems. The development of such devices necessitates innovative approaches to the generation of electro-magnetic radiation. To implement these approaches, we take advantage of the unique features associated with certain high cross-section, highly selective exothermic reactions and couple these factors in a unique fashion with modern approaches to rapid gas expansion and agglomeration flow entrainment.

Efforts toward the goal of a visible chemical laser oscillator are to be encouraged for not only is there reason to pursue these systems for their potential high gain, but also, given similar power levels, a device based on an electronic transition holds advantage over those based on infrared transitions in that the size of the device may be smaller, the power consumption efficiency larger, and the optics considerably simplified relative to the infrared. Devices once constructed and optimized can play an important role in a diversity of field based operations. Finally, chemical lasers once developed are inherently more efficient than systems based exclusively on electrical power input.

SUMMARY OF INVENTION

The present invention is a purely chemically driven visible laser. In this invention a highly efficient exothermic chemical reaction provides the energy source for the amplification of light in the visible and ultraviolet spectral ranges instead of an external source, such as an electrical source or other laser.

Experimentally, sodium metal cluster-halogen atom reactions ($M_x + X$) produce chemiluminescent emission from highly efficient and exothermic reactions. Surprisingly, the electronic emission spectrum which results from the sodium trimer reaction is characterized by sharp well-defined emission regions in the visible spectral range superimposed on a much weaker but perceptible background. The sharp nature of several of the fluorescence features suggests the possibility of a stimulated emission process which has now been demonstrated as part of the present invention. The sharper emission features correspond to the establishment of a population inversion at relatively low pressures in a high gain system. Extremely efficient reactions rapidly deplete the population of those lower state terminating energy levels associated with the lasing transitions allowing one to sustain a continuous population inversion and stimulated emission.

The laser of the present invention comprises a means for producing a select metal trimer and directing the trimer into a reaction zone within a reaction chamber, and a means for dissociating halogen molecules into halogen atoms, which also are directed into the reaction zone. The metal trimer and the atomic halogen react chemically to produce an electronically excited metal dimer species which subsequently produces the laser emission.

The means for producing the select metal trimer can take any form suitable for producing the trimer from a source of pure metal and providing it in sufficient concentration within the reaction zone. One suitable means for producing the trimer relies on a supersonic beam or expansion source comprising an oven for vaporizing the metal and a means for directing the metal vapor through a supersonic nozzle into the reaction zone, the quantity and concentration of the trimer produced being dependent upon the oven configuration and temperature. If the oven temperature is too low, too little trimer will be formed. If the oven temperature and metal vapor pressure is too high, it may be necessary to deal with metal polymers of the form $M_x$, wherein x is greater than or equal to 4. However, in those studies conducted thus far, this has not been a problem. Alternate means for producing the trimer include seeded supersonic expansions.

The preferred source or means for producing the halogen atoms from a dissociation process includes a graphite tube furnace in which halogen molecules are heated to produce the halogen atoms necessary for the energy supplying chemical reaction. Other means for producing the halogen atoms include the use of an excimer laser to dissociate the halogen molecules.

The concentration of metal trimer provided to the reaction zone must be high enough to generate enough excited state molecules from the chemical reaction. An insufficient concentration will not produce sufficient population inversion, and hence, will not produce an adequate amplifying medium. Generally, the lower bound concentration is in excess of about $3 \times 10^{12}$ trimer molecules/cm$^3$ in the reaction zone. This concentration, however, will depend upon the metal selected and the specific chemical reaction employed.

It will be seen from the detailed description of our invention presented below that our purely chemically driven laser not only yields continuous laser amplification in the visible spectral ranges, but also is inherently more efficient than prior systems based exclusively on electrical or optical power input. Our novel laser system also enjoys higher gain, and given similar power levels as prior devices is potentially smaller than and considerably simplified relative to typical infrared systems.

DETAILED DESCRIPTION OF INVENTION

It is now widely accepted that most successful electronic transition chemical lasers will require a two-step approach in which chemical energy is released in the first step and then transferred to an appropriate laser medium in the second step. In contrast, the present system takes advantage of a number of unusual properties associated with certain metal trimer - halogen atom, $M_3-X$, reaction systems. We produce lasing action from a direct, highly efficient and exothermic chemical reaction which selectively pumps certain energy levels associated with several electronically excited states of the product metal dimer of the reaction system. This pumping process produces a population inversion with respect to certain vibrationally excited ground state levels of the metal dimer product. When the stimulated emission process populates these lower terminating levels, the further reaction of these vibrationally excited metal dimers with halogen atoms is rapid and they are quickly removed from the gain medium. The key steps are (1) a highly efficient and selective population (pumping) of dimer excited states, and (2) the rapid depletion of those lower state levels in which the laser transitions terminate. The system is also described in Cobb, S. H., R. Woodward, and J. L. Gole, *A Chemical Process Producing a Continuous Laser Amplifier in the Visible Region*, 43 Chemical Physics Letters 3:204-213 (Jan. 15, 1988) and in *Gas-Phase Characterization of the Molecular Electronic Structure of Metal Clusters and Metal Oxidation*, a thesis presented to The Faculty of the Division of Graduate Studies, by Stephen Hal Cobb, in partial fulfillment of the requirements for the degree Doctor of Philosophy in Physics, Georgia Institute of Technology, August, 1988, both of which are incorporated herein by this reference.

The present invention makes use of the following highly exothermic reaction as the energy source for the amplification of light in the visible and ultraviolet spectral ranges:

$$M_3 + X \rightarrow M_2^* + MX$$

wherein:

M=Na, Li, K, Ca, Pb, Bi, Cu

X=Cl, Br, I

The product dimer electronic emissions resulting from these processes will amplify radiation to various degrees as each system is operated under the desired conditions. The electronic emission spectra resulting from, for example, the sodium trimer-halogen atom reactions encompasses the $M_2=Na_2$ $A^1\Sigma_u^+ - X^1\Sigma_g^+$, $B^1\pi_u - X^1\pi_u$, $C^1\pi_u - X^1\Sigma_g^+$, and $2^1\pi_u - {}^1\Sigma_g^+$, band systems, the emission being characterized by sharp well-defined emission regions superimposed on a weaker but perceptible background.

Figure 1:
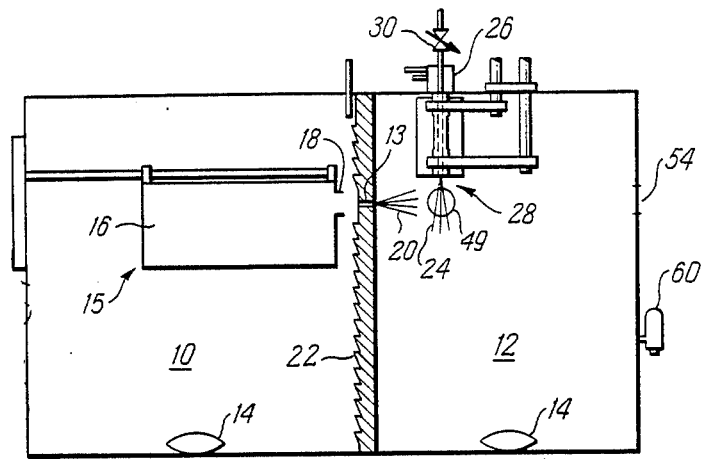
FIG. 1 is a sectional side view schematic of one apparatus used to demonstrate the present invention.
Figure 2:
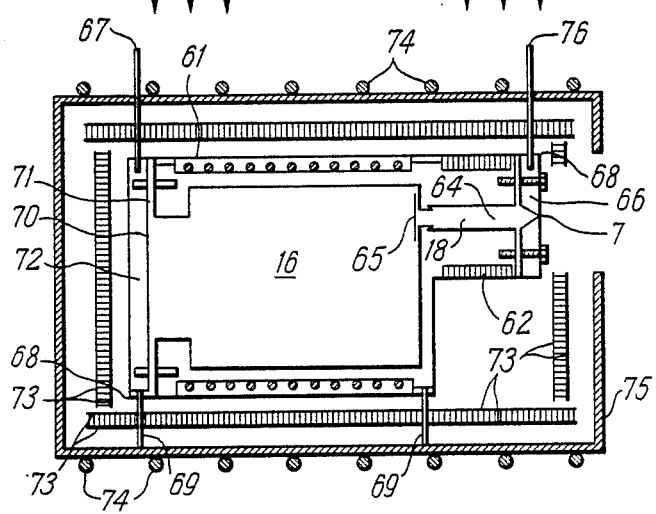
FIG. 2 is a sectional side view of an example of a heating oven and supersonic nozzle configuration for alkali metal.
Figure 3:
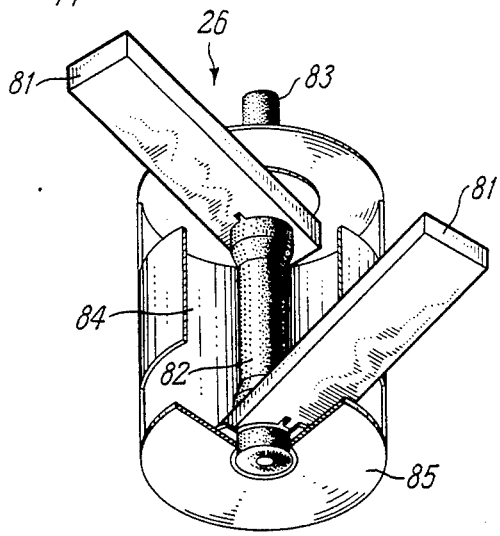
FIG. 3 is a schematic of the halogen graphite furnace and halogen gun as one means for producing dissociated halogen atoms in the present invention.

FIGS. 1-3 present an example of one apparatus and configuration which can be used to produce the chemically driven visible laser of this invention. In this configuration, the laser amplification is produced in a two chamber differentially pumped system consisting of an oven 10 and a reaction chamber 12, connected by a hole 13 about 0.4" in diameter and 0.75" long, both chambers being evacuated to a base pressure of about $10^{-6}$ Torr using 1500 l/sec diffusion pumps (not shown) operated with liquid nitrogen (LN$_2$) trapping 14.

Select metal trimers for the above chemical reaction are produced using a supersonic beam source 15, shown in more detail in FIG. 2. This source preferably consists of an oven chamber 16 and smaller frontal nozzle 18. The metal to be vaporized is introduced into the oven chamber 16 by removing the rear flange 72. Gasket 70 fits between the rear flange 72 and the knife edge 71 to seal the oven chamber 16. The oven chamber 16 is held in a stationary position by a stainless steel sleeve 68 and stainless steel pins 69. Surrounding and insulating the oven chamber 16 are tantulum heat shields 73. The oven chamber 16 in which temperature is measured by thermocouple 67 is heated by the main oven heater 61.

Attached to the front of the oven chamber 16 is the supersonic nozzle 18. Located between the oven chamber 16 and the supersonic nozzle 18 is a tantum splash baffle 65 perforated with one or more small holes through which the amount of vaporized metal entering the supersonic nozzle chamber 64 is regulated. The supersonic nozzle 18 is heated by the nozzle heater 62, which temperature is measured by thermocouple 76. The metal vapor exits the supersonic nozzle 18 through aperture 7 and into the reaction chamber 12 through the channel 13 in the liquid nitrogen baffle 22.

The oven configuration, including the oven chamber 16 and the supersonic nozzle 18, is housed in a brass jacket 75. Surrounding the brass jacket 75 are copper water lines 74 used to circulate cooling water around the oven configuration.

The above-described oven configuration is representative of the experimental apparatus used to vaporize and supersonically expand sodium. This oven design will change dependent upon the different metals to be vaporized. For example, some metals require more heat to achieve the desired vapor pressure and, therefore, the oven will be configured and made of materials capable of withstanding these higher temperatures or differing constituent reactivities.

The metal placed in the larger back oven chamber 16 is heated to temperatures (preferably exceeding 1100 K. for sodium) creating a metal vapor pressure exceeding about 50 Torr until the metal is expended. The metal vapor passes through the splash baffle 88 having one or more small orifices (not shown) leading to the frontal nozzle 18 from where it is supersonically expanded through the channel 13 into the vacuum chamber 12. This heating and supersonic expansion process leads to the formation of metal vapor containing metal atoms, dimers, and trimers, in a ratio which at the lowest preferred temperature operating conditions for sodium is about 1:1:0.03. An ineffectual amount of higher alkali metal polymers, $Na_x$, where $x>4$ are also produced when running under such sodium conditions.

A beam 20 of metal vapor exits the oven chamber 16 through a supersonic nozzle 18 operating at a temperature slightly higher than that for the oven and into the reaction chamber 12. For sodium, for example, the nozzle operates at a temperature of about 1150 K. or higher. Operation of the supersonic beam source under these conditions for sodium leads to the formation of a metal vapor containing metal atoms, dimers, and trimers, which during the operation of the experiment are in a ratio of not less than about 1:1:0.03. Ideally, no more than an insignificant amount of higher metal polymers, $M_x$ where x is greater than or equal to 4, are also produced. The higher the oven temperature, the more trimers are produced and the greater the ratio of trimers to monomers and dimers. Also more additional polymers, $M_x(x>4)$, are produced which at present do not appear to be detrimental to the operation of the invention. The supersonic expansion not only produces the trimer but allows the mass transfer necesssary for this metal trimer into the reaction chamber 12 in sufficient concentration for reaction with the atomic halogen.

The temperature of the oven chamber 16 is not highly critical so long as the quantity of metal trimer produced is sufficient to produce the necessary concentration of metal trimer in the reaction zone 24. The beam density or concentration of metal trimers in the reaction zone 24 should exceed about $3 \times 10^{12}$ trimer molecules per cubic centimeter.

Alternatively, one can modify the oven chamber 16 such that the metal trimer is produced in a different fashion. This can include the seeded supersonic expansion of a lower vapor pressure select metal vapor using an entraining inert gas with subsequent expansion through a modified supersonic nozzle 18. This, of course, requires additional pumping speed in the reaction and oven chambers and will require further modifications of that expansion configuration illustrated in FIGS. 1 and 2. These include modifications to the oven-bulkhead configuration, nozzle convergence, and halogen gun positioning to affect appropriate vapor flow, mixing, and reactive requirements; these modifications would be understood by one skilled in this art.

The critical factor is the concentration of metal trimer introduced into the reaction zone 24. Additionally, although supersonic expansion is the most effective means for introducing a sufficient concentration of metal trimer into the reaction zone 24, other methods are available. One might envision a process involving the heating of the select metal to produce a reasonable metal vapor pressure, between about 1 Torr and about 50 Torr, forming a non-effusive beam and then entraining the metal vapor in a cold inert carrier gas cooled to the desired temperature, causing efficient agglomeration to the trimers, as this mixture is introduced into the reaction zone.

The beam 20 of metal vapor after passing through the supersonic nozzle 18 passes through a liquid nitrogen cooled heat shield and $LN_2$ baffle 22 to the reaction zone 24 in the adjoining reaction chamber 12 which is positioned in front of the supersonic beam source 15 and connecting hole 13 which joins chambers 10 and 12. The baffle 22 catches waste metal which does not pass into the reaction chamber and keeps unwanted vapor molecules from disrupting the supersonic expansion.

The halogen for the above reaction must be supplied to the reaction zone 24 in the form of atoms. One device for providing such halogen atoms to the reaction zone 24 is a graphite tube furnace 26. The amount of halogen entering the tube furnace 26 is regulated manually via a valve 30 attached to a halogen molecule reservoir bulb (not shown). The flow is adjusted to produce optimum gain conditions; that is, the flow is adjusted such that enough atomic halogen is produced to optimize the lasing action created when the halogen atoms react with the select metal trimers. Care is taken not to increase the flow for maximum chemiluminescent intensity, since other competing processes may make the measurement of laser gain difficult or impossible as they increase the opacity of the reaction zone 24.

Halogen gas molecules are fed into the graphite tube furnace 26 operating at about 1500K. or higher, depending on the halogen selected, which dissociates these molecules to halogen atoms of the desired temperature distribution and concentration. The graphite tube furnace 26, as shown in FIG. 3, was developed especially for this reaction configuration and consists of two electrodes 81, a graphite heating element 82, a gas inlet connection 83, boron nitride insulators 84, and a stainless steel shield 85. A variable current is passed through the graphite heating element 82 to achieve the desired temperature, preferably in the range 1500-1600 K. Halogen gas is introduced into the graphite tube furnace 26 through the gas inlet connection 83 where it dissociates into halogen atoms. The graphite tube furnace 26 has a 95+% efficiency rate for dissociating molecular halogen into atomic halogen when operated in the preferred temperature range. These halogen atoms then leave the halogen tube furnace 26 through the gun 28 and flow into reaction zone 24.

Generally, a homonuclear halogen molecule is used due to the lower complexity inherent in a pure halogen system as compared to that associated with the use of a heteronuclear halogen molecule. Additionally, homonuclear halogen systems generally have a lower dissociation energy requirement than do mixed halogen systems. The vapor pressure of bromine is sufficient to produce the required flux to the inlet of the graphite tube furnace, however, iodine may need to be heated to between about 40° C. and about 70° C. in order to maintain the required vapor pressure and thus the required flux to the furnace.

Furthermore, it is not critical how the halogen atoms are produced, merely that atomic halogen rather than molecular halogen is produced and introduced into the reaction zone 24. Accordingly, any alternative method of providing a sufficient concentration of atomic halogen is acceptable. For example, one can use an excimer laser to dissociate the halogen molecules into halogen atoms.

The halogen atoms entering the reaction zone 24 chemically react with the select metal trimers entering the reaction zone in the above reaction where the $M_2^*$ is an excited metal dimer. Certain of the excited metal dimers then are formed in electronically inverted population distributions which result in a visible chemical laser amplifier at several select wavelengths. For studies at 0.5 cm$^{-1}$ resolution, a maximum laser gain of 1% of the input laser power, described below, was achieved at 5270 A with gains of 0.3% at 4920 A and 0.8% at 4605 A, respectively. This is to say that optical gain through stimulated emission has been found to result from a purely chemically driven light amplification process. The process has also been characterized using single mode (0.007 cm$^{-1}$) laser gain measurements extending from 5270.3 A to 5266.3 A to demonstrate the degree of amplification for individual rovibronic levels in this region. A maximum gain close to 3.8% has been recorded in the single mode studies. See Cobb, S. H., J. R. Woodward, and J. L. Goles, Continuous Chemical Amplification of Single and Multi-mode Lasers in the Visible Region, Chem. Phys. Letter (in press, Jan. 1989), incorporated herein by this reference.

Figure 4:
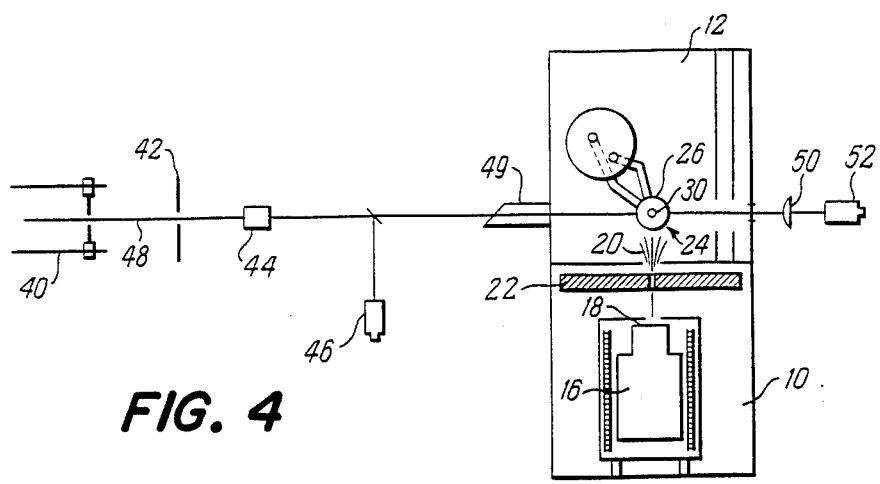
FIG. 4 is a sectional top view schematic of the arrangement of the apparatus employed for laser gain measurements to probe stimulated emission from the $M_3-X$ metatheses the basis of the present invention.

The laser gain was measured in these systems across the spectral regions extending from 4200 A to 6000 A using several argon ion pumped dye lasers 40 operating at 0.5 cm$^{-1}$ resolution, as shown in FIG. 4. The dye lasers 40 were tuned using a three stage birefringent filter. Constant dye laser power was maintained using a Spectra Physics Model 373 light stablizer 44. High resolution ring dye laser studies also using a Coumarin 540 dye laser have been conducted over the range 5270.3 A to 5260.3 A. The laser beam 48 was passed through a chopper 42 and split into two branches; one branch is directed into a reference photodiode 46, the other delivered to the select metal-halogen reaction chamber 12 through window 49, also shown in FIG. 2. The beam 48 for the 0.5 cm$^{-1}$ resolution studies entered the vacuum chamber 12 with approximately 10 mW of power (for the high resolution ring dye studies less than 2 mW), collimated at a diameter of approximately 5 mm, and oriented so as to be perpendicular to both the flow of halogen atoms 28 and the metal vapor beam 20. After passing through the reaction zone 24, the beam 48 exits the reaction chamber 12, is collected by a 50 mm focal length plano-convex lens 50 and focused onto a second photodiode detector 52.

To discriminate against blackbody radiation from the halogen dissociation furnace 26, the beam 48 is chopped and detected with a lock-in amplifier (not shown). The amplifier was operated in the A-B mode, providing the opportunity to detect changes in laser beam 48 intensity occurring only in branch A as the laser beam 48 passes through the select metal-halogen reaction zone 24. The output from the lock-in was fed to a DSP technology 2001 digital transient recorder (not shown) equipped with a Model 4100 signal averaging module. The averaged output from this recorder is passed to a data monitor and storage device, such as an IBM PC-XT personal computer, where the data is monitored and stored. Alignment of the metal beam 20, the halogen atom source 26, and the laser beam 48 such that the beam 48 passes directly through the center of the reaction zone 24 is accomplished by viewing the reaction zone 24 and the beams 20, 24, and 48 through the oven alignment window 54 shown in FIG. 1.

The preferred alkali metal for producing the visible laser invention is sodium, while the preferred halogens are bromine and iodine. Specific tests using these preferred compounds were used to produce the forerunning studies of chemiluminescent emission shown in FIG. 5. In these studies approximately 100 gms of sodium were placed in the oven chamber 16 and heated from 950-1100 K. producing experimental runs 1-3 hours in duration depending on the oven temperature and conditions under which all of the sodium was substantially vaporized and expended. The nozzle temperature was maintained in the range of 1000-1250 K. The halogen was dissociated using the graphite tube furnace 26 operating at about 1600 K. Typical chamber running pressures ranged from a low of 10$^{-5}$ Torr to a high of 10$^{-2}$ Torr Sodium trimer was produced by supersonic expansion through a frontal nozzle 18 providing sodium atoms, dimers and trimers in a ratio of approximately 1:1:0.03 and a concentration of about $3 \times 10^{12}$ sodium trimer molecules/cm$^3$ at the reaction zone.

Gain studies were conducted on this same sodium based system by operating the system in the same manner as described above, only increasing the oven temperature so as to expend 100+ gms of sodium within a period of 20 to 40 minutes. Under these conditions, the ratio of sodium trimers to the sum of the dimer and monomer concentration increases significantly and the concentration of trimers in the reaction zone is between 10 and 500 times that for the chemiluminescence studies outlined above. No effort was made to avoid production of sodium polymers, Na$_x$, where $x \geq 4$.

Laser gain was observed only when a sufficient trimer flux was generated and only when the $M_3 + X$ reaction was initiated. During the laser gain experiments, once the M$_3$ concentration was established and gain observed, the sodium source temperature was continually increased to maintain the vapor pressure (flux) required for the gain condition. The gain observed in these systems was found to depend both upon the Na$_3$ and the halogen atom concentrations. Further, as the laser 40 power was changed, the photodiode signal (A-B) was found to vary linearly with laser power indicating that the system operates within the small signal gain regime.

Figure 5:
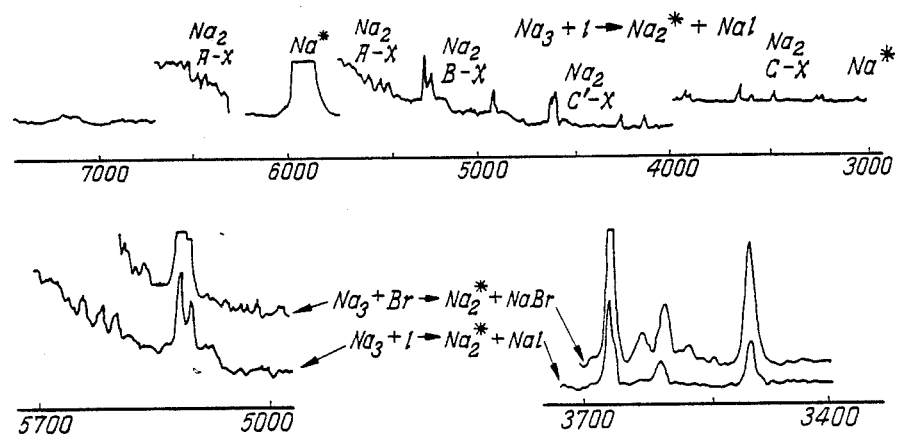
FIG. 5 is a representative chemiluminescent emission spectrum demonstrating the sharp well-defined emission features resulting from the reaction which is a basis of the present invention.

When the argon ion pumped Coumarin dye laser was operated at 0.5 cm$^{-1}$ resolution, gains of close to 1% were repeatedly observed at 5270 A, while gains of 0.3% and 0.8% were detected at 4920 A and 4605 A respectively. The observed gains correspond to a portion of the sharp well-defined emission regions of FIG. 5. FIG. 5 depicts the unusual chemiluminescent emission from the sodium trimer-iodine atom and trimer-bromine atom reactions which form the gain medium for the first continuous visible chemical laser amplifiers. Amplification characterization focuses on the sharp emission features superimposed on the broad background of fluorescence. These features are found at approximately 5270, 4920, 4605, 4360, 4260, 4125, 3950, 3650, and 3500 A.

It is to be emphasized that the amplifier which forms the basis of the present invention relies primarily on the high cross-sections associated with select metal molecule-halogen atom chemical reactions both to form lasing medium and to remove the lower terminating level ground state metal dimers formed in the stimulated emission process. Collisional deactivation is not a major factor in the present invention especially for the Na$_2$ excited states formed in the reaction, whereas it is tantamount to the continuous wave operation of optically pumped heat pipe laser systems.

It now becomes apparent that the above described purely chemical process yielding continuous laser amplification in the visible spectral ranges and the apparatus for carrying said process are capable of obtaining the above-stated objects and advantages. It is obvious that those skilled in the art may make modifications to the process or the apparatus or both, without departing from the spirit of the invention or the scope of the subjoined claims.

We claim:

1. A chemical process yielding laser amplification in the visible and ultraviolet spectral ranges comprising the steps of:
   (a) providing a source of metal;
   (b) producing metal trimers from said source of metal;
   (c) providing a source of halogen molecules;
   (d) dissociating the halogen molecules to form halogen atoms; and
   (e) chemically reacting the metal trimers and the halogen atoms to form a lasing medium comprised of electronically excited metal dimer molecules which produces laser amplification.

2. A process as defined in claim 1, further including the step of removing those metal dimer molecules populating the lower state levels in which the laser transitions terminate after they are formed following said laser amplification.

3. A process as defined in claim 1, wherein the metal is selected from the group consisting of sodium, lithium, potassium, calcium, lead, bismuth, and copper.

4. A process as defined in claim 1, wherein the metal is sodium.

5. A process as defined in claim 4, wherein the halogen molecules are selected from the group consisting of bromine and iodine.

6. A process as defined in claim 1, wherein the halogen molecules are selected from the group consisting of flourine, chlorine, bromine, and iodine.

7. A process as defined in claim 5, wherein the halogen atoms are produced by heating and dissociating halogen molecules in a furnace.

8. A process as defined in claim 7, wherein the furnace is heated to a temperature of at least about 1500 K.

9. A process as defined in claim 1, wherein the halogen molecules are selected from the group consisting of bromine and iodine.

10. A process as defined in claim 1, wherein the halogen is selected from the group consisting of fluorine and chlorine.

11. A process as defined in claim 1, wherein said metal trimers are produced by means of supersonic expansion.

12. A process as defined in claim 11, wherein said supersonic expansion is carried out by heating the source of metal in an oven to produce metal vapor and passing the metal vapor through a supersonic nozzle.

13. A process as defined in claim 12, wherein in the supersonic expansion of the metal vapor, the vapor pressure generated in the oven is at least about 50 Torr.

14. A process as defined in claim 1, wherein the metal trimer is produced by means of seeded supersonic expansion.

15. A process as defined in claim 1, wherein said metal trimers are produced by a mild supersonic expansion combined with the subsequent flow-entrainment agglomeration of the products of the expansion.

16. A process as defined in claim 1, wherein said step of producing metal trimers includes producing metal atoms, metal dimers, and a small concentration of higher polymers the latter of which might also react to contribute to the metal dimer amplification process.

17. A process as defined in claim 16, wherein the ratio of metal atoms to metal dimers and metal trimers is 1:1:0.03.

18. A process as defined in claim 17, wherein the ratio of trimers to the metal atom plus metal dimer concentration is increased to a higher value than said ratio.

19. A process as defined in claim 17, wherein the concentration of metal trimers is between about 10 and 500 times its concentration when the ratio of metal atoms to metal dimers and metal trimers is 1:1:0.03.

20. A process as defined in claim 1, wherein the step of dissociating the halogen molecules to form halogen atoms includes providing sufficient energy to said halogen molecules to perform said dissociation, said energy being supplied by a source of electromagnetic radiation.

21. A process as defined in claim 20, wherein the source of electromagnetic radiation is an excimer laser.

22. A process as defined in claim 1, wherein the reaction of the metal trimers and halogen atoms takes place within a reaction zone in which metal trimer is provided in a concentration in excess of $3 \times 10^{12}$ metal trimer molecules/cm$^3$ in the reaction zone.

23. A chemical laser for amplification of visible and ultraviolet light comprising means for producing metal trimers from a source of metal, means for dissociating halogen molecules to form halogen atoms, a reaction chamber, and means for delivering the metal trimer and halogen atoms into the reaction chamber to chemically react the metal trimer and halogen atoms to form electronically excited metal dimer molecules in sufficient concentration to create a population inversion and laser amplification.

24. A laser as defined in claim 23, wherein the metal is selected from the group consisting of sodium, lithium, potassium, calcium, lead, bismuth, and copper.

25. A laser as defined in claim 23, wherein the metal is sodium.

26. A laser as defined in claim 23, wherein the halogen molecules are selected from the group consisting of fluorine, chlorine, bromine, and iodine.

27. A laser as defined in claim 26, wherein the means for dissociating halogen molecules to form halogen atoms includes means for heating and dissociating halogen molecules.

28. A laser as defined in claim 27, wherein said means for heating halogen molecules is heated to a temperature of at least about 1500 K.

29. A laser as defined in claim 23, wherein the halogen molecules are selected from the group consisting of bromine and iodine.

30. A laser as defined in claim 23, wherein the halogen molecules are selected from the group consisting of bromine and iodine.

31. A laser as defined in claim 23, wherein the halogen is selected from the group consisting of fluorine and chlorine.

32. A laser as defined in claim 23, wherein said means for producing metal trimers includes means for producing metal vapor from said source of metal and supersonically expanding the metal vapor to produce the metal trimers.

33. A laser as defined in claim 32, wherein said means of supersonic expansion includes heating means for heating the source of metal to produce metal vapor and passing the metal vapor through a supersonic nozzle.

34. A laser as defined in claim 33, wherein the vapor pressure of the metal vapor produced in the heating means is at least about 50 Torr.

35. A laser as defined in claim 23, wherein said means for producing metal trimers includes means for producing metal vapor from said source of metal, seeding said metal vapor into an entraining non-reactive carrier gas and supersonically expanding the metal vapor and carrier gas to produce the metal trimers.

36. A laser as defined in claim 23, wherein said means for producing metal trimers includes means for producing metal vapor from the source of metal and mild supersonic expansion of the metal vapor combined with the subsequent flow-entrainment agglomeration of the products of the expansion.

37. A laser as defined in claim 23, wherein the means for producing metal trimers also produces metal atoms and metal dimers and the ratio of metal atoms to metal dimers and metal trimers produced is 1:1:0:03.

38. A laser as defined in claim 37, wherein the ratio of trimers to the metal atom plus metal dimer concentration is increased to a higher value than said ratio.

39. A laser as defined in claim 37, wherein the concentration of metal trimers produced is between about 10 and 500 times its concentration when the ratio of metal atoms to metal dimers and metal trimers is 1:1:0.03.

40. A laser as defined in claim 23, wherein the means for dissociating halogen molecules to form halogen atoms includes a source of electromagnetic radiation for providing sufficient energy to the halogen molecules to cause dissociation of the halogen molecules into halogen atoms.

41. A laser as defined in claim 40, wherein the source of electromagnetic radiation is an excimer laser.

* * * * *